(12) United States Patent
Tanaka (10) Patent No.: US 12,509,068 B2
(45) Date of Patent: Dec. 30, 2025

(54) COLLISION AVOIDANCE SUPPORT DEVICE AND NON-TRANSITORY COMPUTER-READABLE STORAGE MEDIUM

(71) Applicant: TOYOTA JIDOSHA KABUSHIKI KAISHA, Aichi (JP)

(72) Inventor: Tomohiro Tanaka, Nisshin (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 202 days.

(21) Appl. No.: 18/459,367

(22) Filed: Aug. 31, 2023

(65) Prior Publication Data

US 2024/0083418 A1 Mar. 14, 2024

(30) Foreign Application Priority Data

Sep. 14, 2022 (JP) ................ 2022-145748

(51) Int. Cl.
*B60W 30/09* (2012.01)
*B60W 10/02* (2006.01)
*B60W 10/20* (2006.01)
*B60W 30/095* (2012.01)

(52) U.S. Cl.
CPC ............ *B60W 30/09* (2013.01); *B60W 10/02* (2013.01); *B60W 10/20* (2013.01); *B60W 30/0956* (2013.01); *B60W 2554/80* (2020.02)

(58) Field of Classification Search
CPC ...... B60W 30/09; B60W 10/02; B60W 10/20; B60W 30/0956; B60W 2554/80; G05D 1/622; G08G 1/16; G08G 1/00; B62D 1/00

USPC .......................................... 701/301; 477/166
See application file for complete search history.

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |
| 9,483,945 B2 | 11/2016 | Okita et al. | |
| 9,873,412 B2 | 1/2018 | Moriizumi | |
| 10,793,147 B2 | 10/2020 | Kaminade et al. | |

(Continued)

FOREIGN PATENT DOCUMENTS

| | | | | |
|---|---|---|---|---|
| EP | 464821 A | * | 1/1992 | ........... G01S 13/931 |
| EP | 1564062 A2 | * | 8/2005 | ......... B60K 31/0008 |

(Continued)

*Primary Examiner* — Tuan C To
(74) *Attorney, Agent, or Firm* — HAUPTMAN HAM, LLP (57) ABSTRACT

A collision avoidance support device that is applied to a vehicle equipped with clutch-type front and rear stabilizers controlled in coupled and uncoupled states and an automatic steering device, and comprises a control unit that is configured to, when it is determined that a collision with an obstacle in front of the vehicle needs to be avoided, calculate a target control amount for causing the vehicle to run along a target trajectory for avoiding the collision and control the automatic steering device based on the target control amount, and the control unit is further configured to, when it is determined that a collision needs to be avoided in a situation in which at least one of the stabilizers is in the uncoupled state, calculate a target control amount for causing the vehicle to run along the target trajectory based on a steer characteristic of the vehicle at that time.

5 Claims, 6 Drawing Sheets

(56) References Cited

U.S. PATENT DOCUMENTS

| | | | |
|---|---|---|---|
| 2002/0156580 A1* | 10/2002 | Matsuura | B60T 8/17558 |
| | | | 701/41 |
| 2004/0167702 A1* | 8/2004 | Isogai | B60T 17/221 |
| | | | 340/436 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2023/0090844 A1* | 3/2023 | Park | G06V 20/588 |
| | | | 701/301 |
| 2023/0202461 A1* | 6/2023 | Park | B60W 30/02 |
| | | | 701/82 |
| 2023/0227025 A1* | 7/2023 | Kuramochi | B60W 50/0097 |
| | | | 701/301 |

FOREIGN PATENT DOCUMENTS

| | | | | |
|---|---|---|---|---|
| JP | H07186683 A | | 7/1995 | |
| JP | 2000289427 A | | 10/2000 | |
| WO | WO-2013045987 A2 * | | 4/2013 | B60T 7/22 |

* cited by examiner

COLLISION AVOIDANCE SUPPORT DEVICE AND NON-TRANSITORY COMPUTER-READABLE STORAGE MEDIUM

CROSS-REFERENCE TO RELATED APPLICATION

This application claims priority to Japanese Patent Application No. JP2022-145748 filed on Sep. 14, 2022, the content of which is hereby incorporated by reference in its entirety into this application.

BACKGROUND

1. Technical Field

The present disclosure relates to a collision avoidance support device and a non-transitory computer-readable storage medium storing a program for causing a computer installed on a vehicle to execute a collision avoidance support control.

2. Description of the Related Art

Collision avoidance support device by automatic steering is known as one of driving support device for vehicles such as automobiles. When it is necessary to avoid a collision with an obstacle in front of a vehicle, the collision avoidance support device calculates a target steering angle for causing the vehicle to run along a target trajectory for avoiding a collision with the obstacle, and controls an automatic steering device so that a steering angle becomes the target steering angle.

Incidentally, a vehicle such as an automobile is provided with front and rear stabilizers for ensuring a roll rigidity of the vehicle. When left and right wheels bound and rebound in opposite phases, the stabilizers generate anti-roll moments due to twisting of a laterally extending torsion bar portion, thereby ensuring steering stability of the vehicle.

As one of the stabilizers, a clutch type stabilizer is known in which a torsion bar portion is divided into left and right torsion bar portions, and coupling and uncoupling of the left and right torsion bar portions is controlled by an actuator. For example, Japanese Patent Application Laid-open No. H07-186683 describes that riding comfort of a vehicle when traveling on a bad road is improved by releasing coupling of left and right torsion bar portions to control a torsion bar to an uncoupled state.

In a vehicle in which clutch-type stabilizers are mounted, as will be described in detail later, steer characteristic of the vehicle change depending on whether the stabilizers are in a coupled state or not. When the steer characteristic of the vehicle changes, a relationship between a steering angle and a turning radius of the vehicle also changes. Therefore, even if an automatic steering device is controlled so that a steering angle becomes a target steering angle, the vehicle cannot be driven along the target trajectory for avoiding a collision with an obstacle, and performance of collision avoidance deteriorates.

SUMMARY

The present disclosure provides a collision avoidance support device which is improved so that a vehicle can be driven along a target trajectory to avoid a collision with an obstacle even when at least one of front and rear side stabilizers is in an uncoupled state. The present disclosure also provides a non-transitory computer-readable storage medium storing a program for causing a computer installed on a vehicle to execute a collision avoidance support control.

According to the present disclosure, a collision avoidance support device is provided that is applied to a vehicle equipped with clutch-type front and rear stabilizers controlled in a coupled state and in an uncoupled state and an automatic steering device that automatically steers steered wheels, and comprises a control unit that is configured to, when it is determined that a collision with an obstacle in front of the vehicle needs to be avoided, calculate a target control amount for causing the vehicle to run along a target trajectory for avoiding a collision with the obstacle and control the automatic steering device based on the target control amount.

The control unit is configured to, when it is determined that a collision with an obstacle in front of the vehicle needs to be avoided in a situation in which at least one of the stabilizers is in the uncoupled state, calculate a target control amount for causing the vehicle to run along the target trajectory based on a steer characteristic of the vehicle when at least one of the stabilizers is in the uncoupled state.

The present disclosure further provides a non-transitory computer-readable storage medium storing a program for causing a computer installed on a vehicle to execute a collision avoidance support control, with the vehicle being equipped with clutch-type front and rear stabilizers controlled in a coupled state and in an uncoupled state and an automatic steering device that automatically steers steered wheels, the program causing the computer to implement processes of: when it is determined that a collision with an obstacle in front of the vehicle needs to be avoided, a step of calculating a target control amount for causing the vehicle to run along a target trajectory to avoid a collision with the obstacle, and a step of controlling the automatic steering device based on the target control amount.

The program further comprises a step of, when it is determined that a collision with an obstacle in front of the vehicle needs to be avoided in a situation in which at least one of the stabilizers is in the uncoupled state, calculating a target control amount for causing the vehicle to run along the target trajectory based on a steer characteristic of the vehicle when at least one of the stabilizers is in the uncoupled state.

Generally, a steer characteristic of a vehicle is set to a weak understeer characteristic (normal steer characteristic) by setting a roll rigidity to be closer to front wheels. That is, a roll rigidity by a front stabilizer is set higher than a roll rigidity by a rear stabilizer. Further, a center of gravity of the vehicle is on the front wheel side than a middle of the front and rear wheels. Therefore, when the front and rear stabilizers become uncoupled, the roll rigidity changes toward the rear wheels when the front and rear stabilizers are in the coupled state, and it is considered that the steer characteristic of the vehicle change to a weak oversteer characteristics.

Further, when the front stabilizer becomes uncoupled due to a failure, for example, the roll rigidity on the front wheel side decreases, so that the steer characteristic of the vehicle changes to a oversteer characteristic. Conversely, when the rear stabilizer becomes uncoupled due to a failure, for example, the roll rigidity on the rear wheel side decreases, so that the steer characteristic of the vehicle changes to an understeer characteristic.

According to the above collision avoidance support device and the non-transitory computer-readable storage medium, when it is determined that it is necessary to avoid a collision with an obstacle in front of the vehicle in a situation where at least one of the stabilizers is in the uncoupled state, a target control amount for causing the vehicle to run along a target trajectory is calculated based on the steer characteristic of the vehicle when at least one of the stabilizers is in the uncoupled state. Therefore, even when at least one of the stabilizers is in the uncoupled state and the steer characteristic of the vehicle is different from the steer characteristic of the vehicle when both of the stabilizers are in the coupled state, it is possible to calculate the target control amount so that it becomes a control amount for causing the vehicle to run along the target trajectory. Therefore, even when at least one of the front and rear stabilizers is in the uncoupled state, the vehicle can be driven along the target trajectory for avoiding a collision with the obstacle.

Further, according to the present disclosure, the control unit is configured, when the front and rear stabilizers are in the uncoupled state, not to calculate the target control amount and not to control the automatic steering device based on the target control amount but to issue an alarm to the effect that the automatic steering for avoiding a collision with an obstacle is not performed, even when it is determined that a collision with an obstacle in front of the vehicle needs to be avoided.

According to the above configuration, it is possible to avoid a running direction of the vehicle from changing without depending on the driver's steering operation and a behavior of the vehicle from becoming unstable due to the automatic steering being performed in a situation where both of the stabilizers are in the uncoupled state and the roll rigidity of the vehicle, and thus the steering stability, is lowered.

In addition, since an alarm to the effect that the automatic steering is not performed to avoid a collision with an obstacle is issued, the driver can recognize that the automatic steering is not performed and a collision with an obstacle must be avoided by his/her own driving operation.

In one aspect of the present disclosure, the control unit is configured to modify the target trajectory based on a steer characteristic of the vehicle when at least one of the stabilizer is in the uncoupled state and, by calculating the target control amount for causing the vehicle to run along the modified target trajectory, calculate the target control amount for causing the vehicle to run along the modified target trajectory based on the steer characteristic of the vehicle when at least one of the stabilizers is in the uncoupled state.

In another aspect of the present disclosure, the control unit is configured, when the front and rear stabilizers are in the uncoupled state, not to calculate the target control amount and not to control the automatic steering device based on the target control amount, even when it is determined that a collision with an obstacle in front of the vehicle needs to be avoided.

Other objects, other features and attendant advantages of the present disclosure will be readily understood from the description of the embodiments of the present disclosure described with reference to the following drawings.

DETAILED DESCRIPTION

A collision avoidance support device according to embodiments of the present disclosure will be described in detail with reference to the accompanying drawings.

Figure 1:
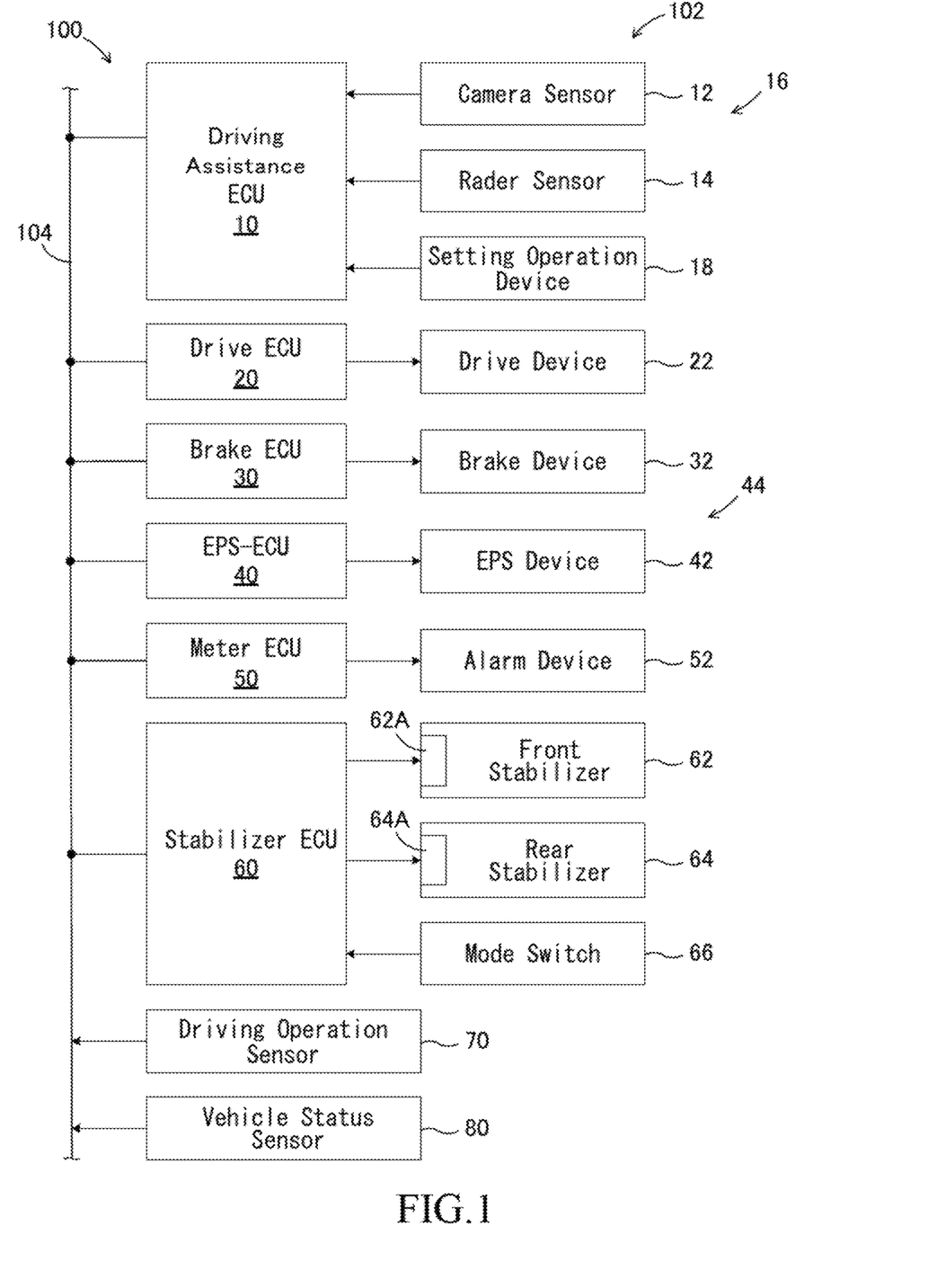
FIG. 1 is a schematic configuration diagram showing a collision avoidance support device according to the first to third embodiments.

As illustrated in FIG. 1, a collision avoidance support device 100 according to the first through third embodiments of the present disclosure is applied to a vehicle 102 and includes a driving assistance ECU 10. The vehicle 102 may be a vehicle capable of automatic driving and includes a drive ECU 20, a brake ECU 30, an electric power steering ECU 40, a meter ECU 50, and a stabilizer ECU 60. ECU means an electronic control unit comprising a microcomputer as its main part. In the following explanation, the electric power steering is referred to as EPS.

A microcomputer in each ECU includes a CPU, a ROM, a RAM, readable and writable non-volatile memories (N/M), interfaces (I/F), and the like. The CPU realizes various functions by executing instructions (programs and routines) stored in the ROM. Furthermore, these ECU are connected to each other so as to be data-interchangeable (communicating) via a CAN (Controller Area Network) 104. Thus, information acquired by sensors (including switches) connected to a particular ECU may be transmitted to other ECU.

The driving assistance ECU 10 is a main control unit which carries out driving assistance control of the vehicle such as collision avoidance support control and lane keeping control. In the embodiments, the driving assistance ECU 10 cooperates with other ECU to perform collision avoidance support control, as will be more fully described below.

A camera sensor 12 and a radar sensor 14 are connected to the driving assistance ECU 10. The camera sensor 12 and the radar sensor 14 each include a plurality of camera devices and a plurality of radar devices. The camera sensor 12 and the radar sensor 14 function as a target information acquisition device 16 that acquires information of a target around the vehicle 102.

Although not shown in the figure, each camera device of the camera sensor 12 includes a camera unit for photographing circumference of the vehicle 102 and a recognition unit for recognizing targets such as white lines of a road and another vehicle by analyzing image data obtained by photographing by the camera unit. The recognition unit supplies the information about the recognized target to the driving assistance ECU 10 at predetermined time intervals.

Although not shown in the figure, each radar device of the radar sensor 14 includes a radar transceiver and a signal processing unit. The radar transceiver radiates a millimeter-wave band radio wave (hereinafter, referred to as "millimeter wave"), and receives millimeter waves (i.e., reflected waves) reflected by a three-dimensional object (e.g., another vehicle, a bicycle, etc.) present in a radiation range. The signal processor acquires information representing a relative distance and a relative velocity between the own vehicle and the three-dimensional object, a relative position (orientation) of the three-dimensional object with respect to the own vehicle, and supplies the information to the driving assistance ECU 10 at predetermined time intervals based on a phase difference between the emitted millimeter wave and the received reflected wave, an attenuation level of the reflected wave, and a time from the radiation of the millimeter wave to the reception of the reflected wave. In place of or in addition to the radar sensor 14, LiDAR (Light Detection And Ranging) may be used.

Furthermore, the driving assistance ECU 10 is connected with the setting operation unit 18. The setting operation unit 18 is provided in a position to be operated by the driver. Although not shown in FIG. 1, the setting operation unit 18 includes a collision avoidance support switch, and the driving assistance ECU 10 executes the collision avoidance support control when the collision avoidance support switch is on. The collision avoidance support control may be executed regardless of whether the collision avoidance support switch is on or not.

The drive ECU 20 is connected with a drive device 22 which accelerates the vehicle 102 by applying a driving force to drive wheels, not shown in FIG. 1. The drive ECU 20 normally controls the drive device 22 so that a driving force generated by the drive device 22 is changed in accordance with a driving operation by the driver, and, when receiving a command signal from the driving assistance ECU 10, controls the drive device 22 based on the command signal.

The brake ECU 30 is connected with a brake device 32 which decelerates the vehicle 102 by braking by applying a braking force to the wheels not shown in FIG. 1. The brake ECU 30 normally controls the brake device 32 so that a braking force generated by the brake device is changed in accordance with a braking operation by the driver, and, when receiving a command signal from the driving assistance ECU 10, executes automatic braking by controlling the brake device 32 based on the command signal.

The EPS-ECU 40 is connected with an EPS device 42. The EPS-ECU 40 controls a steering assist torque by controlling the EPS device 42 based on a steering torque Ts and a vehicle speed V detected by a driving operation sensor 70 and a vehicle status sensor 80, respectively, which will be described later, in a manner known in the art, thereby reducing a driver's steering burden. The EPS-ECU 40 can also steer steered wheels as needed by controlling the EPS device 42. Accordingly, the EPS-ECU 40 and the EPS device 42 function as an automatic steering device 44 that automatically steers the steered wheels as needed.

The meter ECU 50 is connected with an alarm device 52. The alarm device 52 is activated when it is determined that steering is required for the vehicle 102 to avoid a collision with an obstacle in front, and issues an alarm to the effect that steering is necessary to avoid a collision with the obstacle. The alarm device 52 can be any of a display, an alarm device for giving a visual alarm, such as an alarm lamp, an alarm device for giving an audible alarm, such as an alarm buzzer, or an alarm device for giving a sensory alarm, such as a vibration of a seat, and any combination thereof.

The stabilizer ECU 60 is connected with a front stabilizer 62, a rear stabilizer 64, and a mode switch 66. The front stabilizer 62 and the rear stabilizer 64 include actuators 62A and 64A, respectively, which are controlled by the stabilizer ECU 60.

Figure 2:
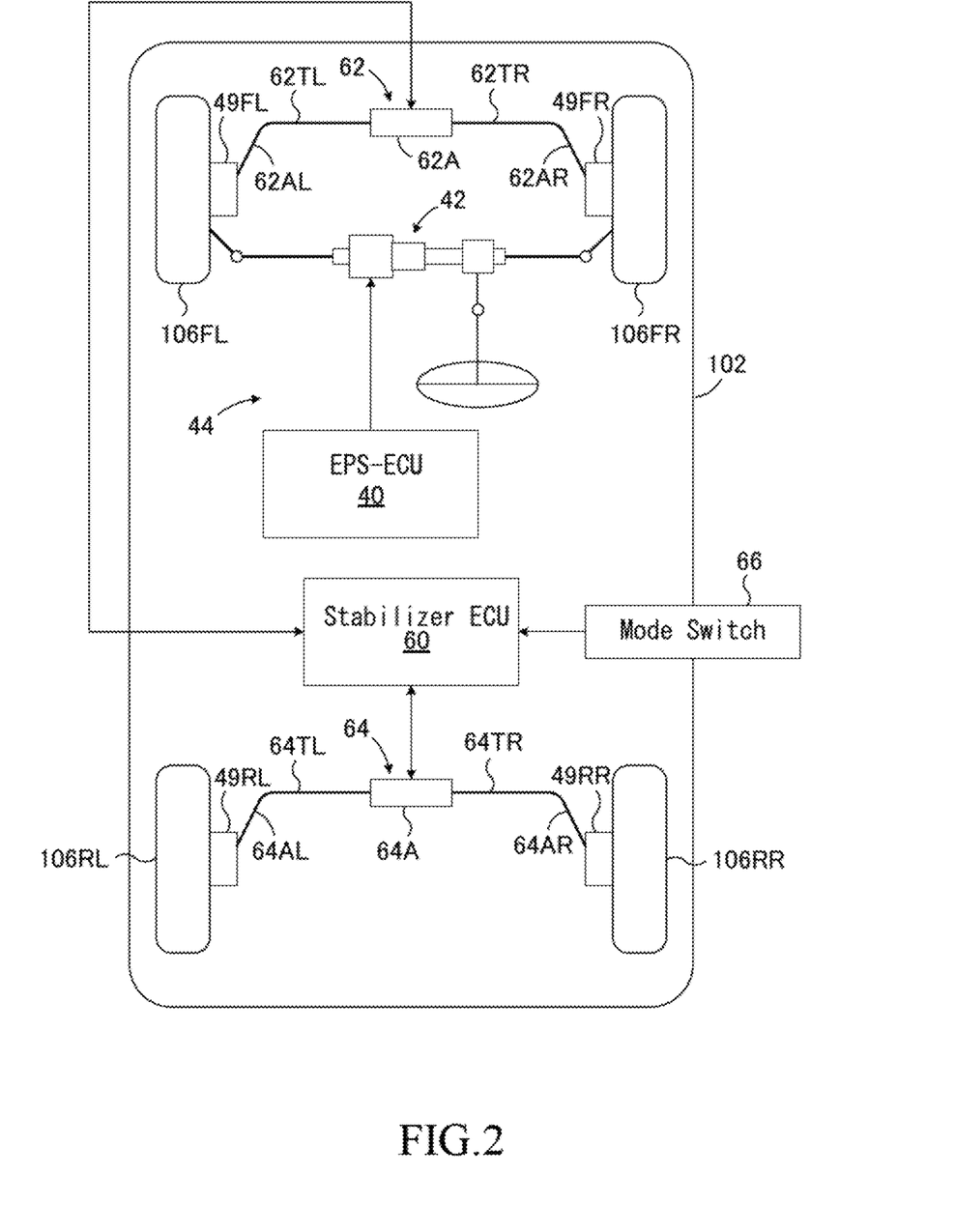
FIG. 2 is a diagram illustrating front and rear stabilizers and an automatic steering device.

As shown in FIG. 2, the front stabilizer 62 is provided between the left and right front wheels 106FL and 106FR, and the rear stabilizer 64 is provided between the left and right rear wheels 106RL and 106RR. The front stabilizer 62 and the rear stabilizer 64 may be clutch type stabilizers of any configuration known in the art, such as, for example, the stabilizers described in Japanese Patent Application Laid-open No. 2000-289427.

The front stabilizer 62 has a pair of torsion bar portions 62TL and 62TR extending laterally coaxially aligned with each other and a pair of arm portions 62AL and 62AR integrally connected to outer ends of the torsion bar portions 62TL and 62TR, respectively. The torsion bar portions 62TL and 62TR are rotatably supported about their own axles to a vehicle body, not shown, via brackets, not shown. The arm portions 62AL and 62AR extend inclined to the front-rear direction of the vehicle with respect to the lateral direction of the vehicle so as to intersect the torsion bar portion 62TL and 62TR, respectively. Outer ends of the arm portions 62AL and 62AR are connected to suspension members 49FL and 49FR, such as suspension arms for the left and right front wheels 106FL and 106FR, respectively via connecting links (not shown).

The actuator 62A is disposed between the torsion bar portions 62TL and 62TR and is controlled according to a position of a mode switch 66 by the stabilizer ECU 60 to function as a clutch. When the mode switch 66 is in a coupled position (normal position), the actuator 62A couples the torsion bar portions 62TL and 62TR (coupled state). In contrast, when the mode switch 66 is in an uncoupled position, the actuator 62A does not couple the torsion bar portions 62TL and 62TR (uncoupled state).

When the stabilizer 62 is in the uncoupled state, the torsion bar portions 62TL and 62TR are free to rotate relative to each other, so that no anti-roll moment is generated and does not function as a stabilizer. Therefore, as compared to when the stabilizer 62 is in the coupled state, a roll rigidity of the front wheel side is reduced. The actuator 62A supplies a signal to the stabilizer ECU 60 indicating whether or not the stabilizer 62 is in the coupled state.

Each member of the rear stabilizer 64 is shown at the reference numeral 64 instead of 62. For example, torsion bar portions, corresponding to torsion bar portions 62TL and 62TR, are shown at 64TL and 64TR, respectively. The rear stabilizer 64 is configured and operates in the same manner as the front stabilizer 62. When the stabilizer 64 is in the uncoupled state, a roll rigidity of the rear wheel side decreases as compared to when the stabilizer 64 is in the coupled state.

The front stabilizer 62 and the rear stabilizer 64 are switched from the coupled state to the uncoupled state by the actuators 62A and 64A, respectively, as the mode switch 66 is changed from the coupled position to the uncoupled position. However, even when the mode switch 66 is changed from the non-connected position to the connected position, the stabilizers 62 and 64 do not return from the uncoupled state to the coupled state until the bound and rebound amounts of the left and right wheels become the same, that is, until a relative rotation of the left and right torsion bar portions becomes 0. Thus, the stabilizers 62 and 64 do not generate an anti-roll moment before returning to the coupled state as in the uncoupled state.

The driving operation sensor 70 and the vehicle status sensor 80 is connected to the CAN 104. Information detected by the driving operation sensor 70 and the vehicle status sensor 80 (referred to as sensor information) is transmitted to the CAN 104. Sensor information transmitted to the CAN 104 is available in the respective ECU as appropriate. Incidentally, information of the sensor connected to a particular ECU may be transmitted from that particular ECU to the CAN 104.

The driving operation sensor 70 includes a driving operation amount sensor and a braking operation amount sensor. Further, the driving operation sensor 70 includes a steering angle sensor, a steering torque sensor, or the like. The vehicle status sensor 80 includes a vehicle speed sensor, a longitudinal acceleration sensor, a lateral acceleration sensor, a yaw rate sensor, and the like.

Figure 3:
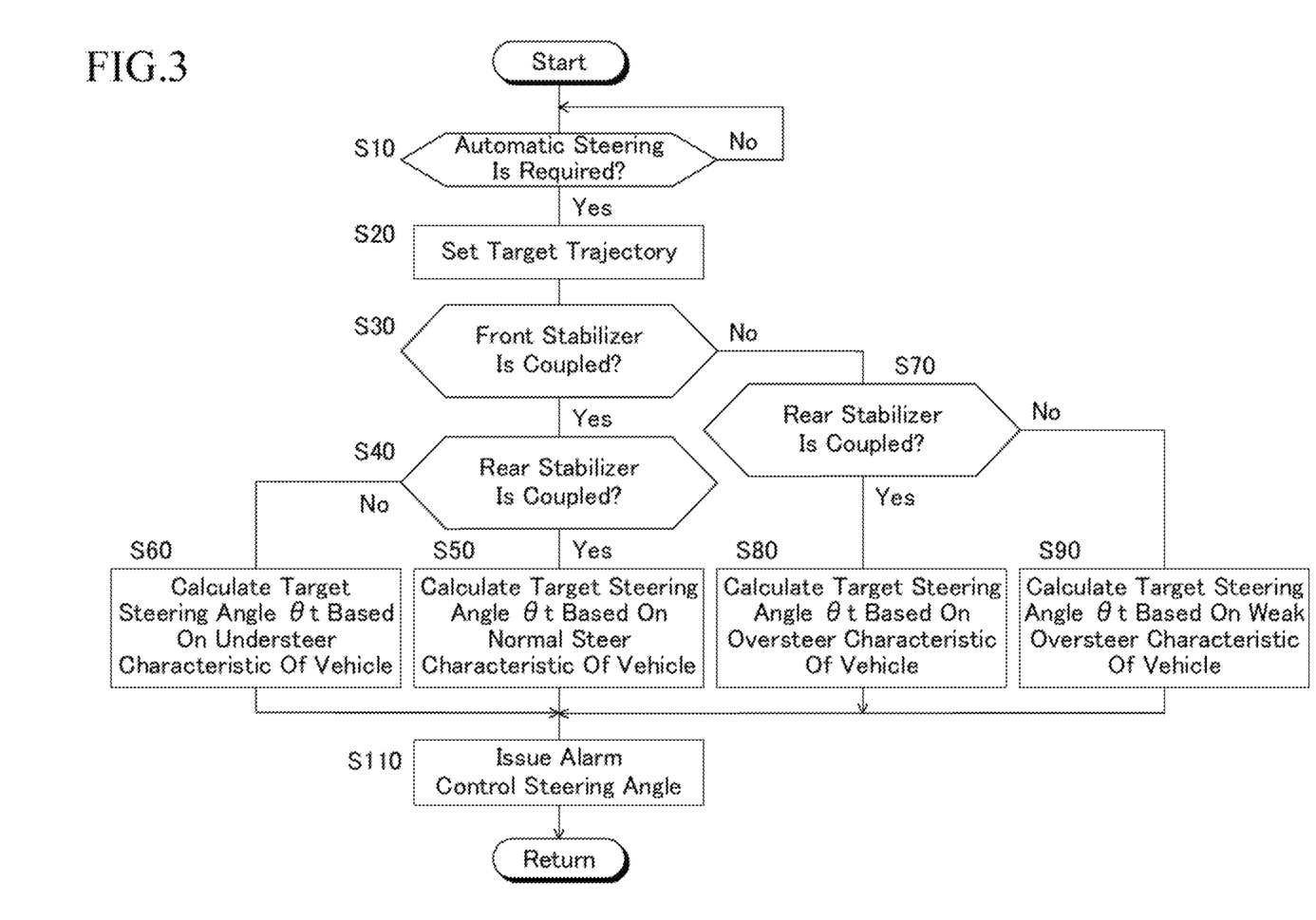
FIG. 3 is a flowchart showing a collision avoidance support control routine in the first embodiment.
Figure 4:
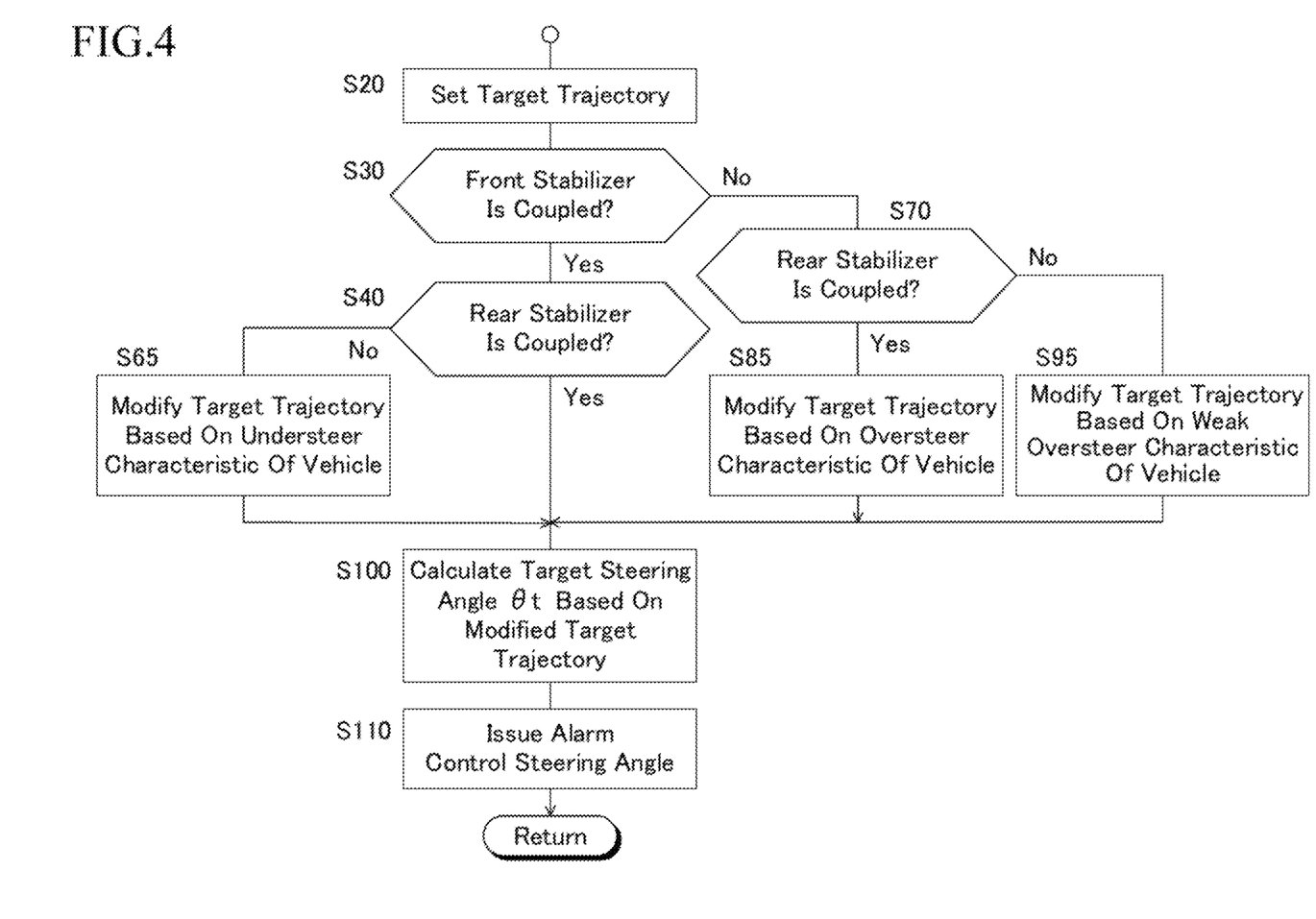
FIG. 4 is a flowchart showing a main part of a collision avoidance support control routine in the second embodiment.
Figure 5:
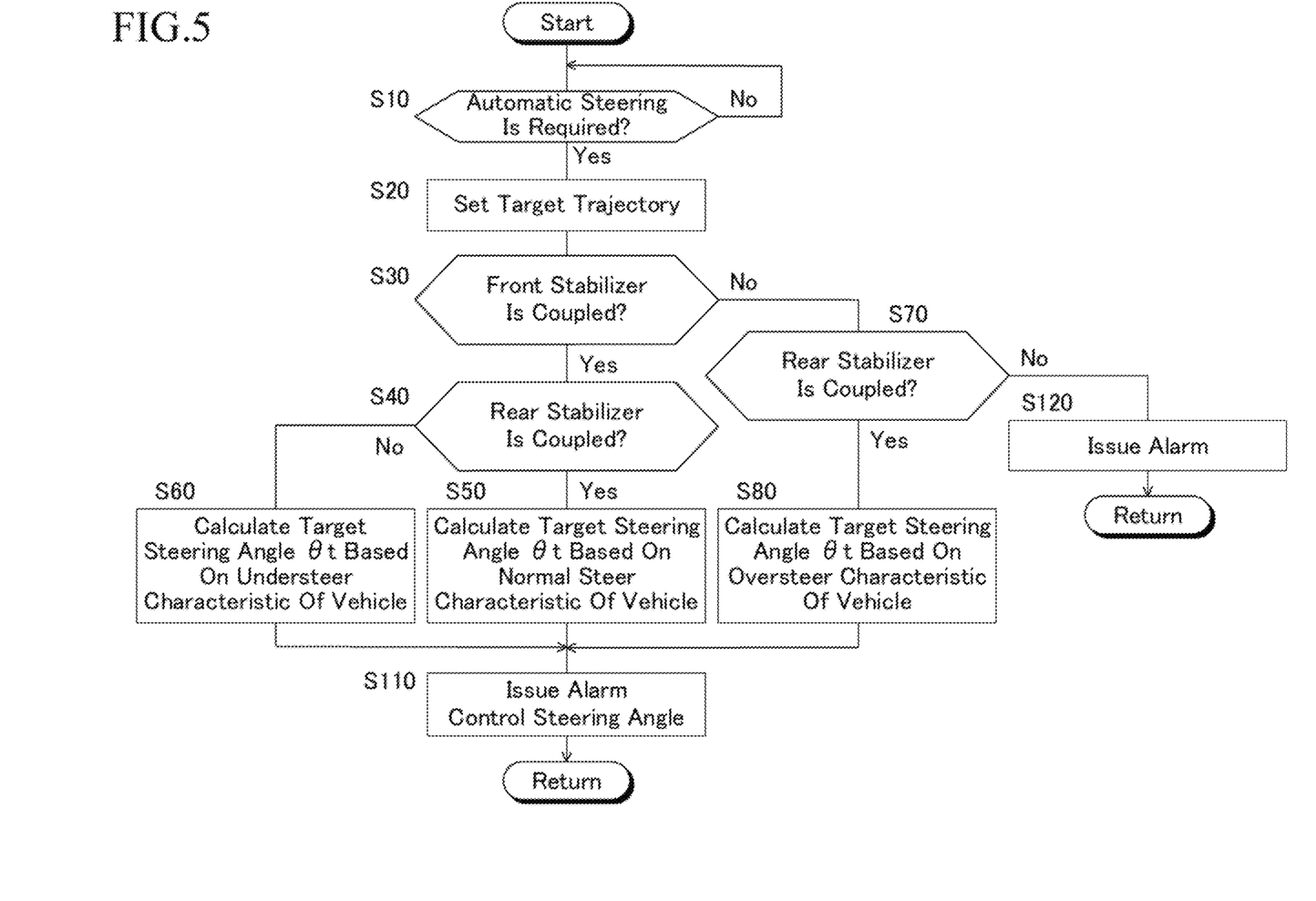
FIG. 5 is a flowchart showing a collision avoidance support control routine in the third embodiment.

In the first to third embodiments, the ROM of the driving assistance ECU 10 stores programs of the collision avoidance support control corresponding to the flow charts shown in FIGS. 3 to 5. The CPU performs collision avoidance support control according to the programs according to the first through third embodiments.

Collision Avoidance Support Control Routine in the First Embodiment

The collision avoidance support control by the flow chart shown in FIG. 3 is performed by the CPU of the driving assistance ECU 10 when the collision avoidance support switch, not shown in FIG. 1, of the setting operation unit 18 is on.

First, in step S10, the CPU determines whether or not the target information acquisition device 16 detects an obstacle in front of the vehicle 102 and the automatic steering is required to avoid a collision with the obstacle in a manner known in the art. When a negative determination is made, the CPU temporarily ends the present control, and when an affirmative determination is made, the CPU advances the present control to step S20.

In step S20, the CPU sets a target trajectory for the vehicle 102 to travel avoiding a collision with the obstacle, in a manner known in the art, based on a positional relation of the vehicle 102 and the obstacle and a relative velocity between them. When an elapsed time since a previous target trajectory was set is less than a reference value (a positive constant), step S20 may be skipped. In addition, when a target trajectory cannot be set, such as a case in which a target trajectory must protrude from a lane in which protrusion is prohibited, an alarm may be issued by operating the alarm device 52 to the effect that a target trajectory cannot be set and the automatic steering for collision avoidance is not performed.

In step S30, the CPU determines whether or not the front stabilizer 62 is coupled. When a negative determination is made, the CPU advances the present control to step S70 and when an affirmative determination is made, the CPU advances the present control to step S40. Incidentally, in the situation where the mode switch 66 has been changed from the coupled position to the coupled position, but the stabilizer 62 is in a state before returning from the uncoupled state to the coupled state, a negative determination is performed.

In step S40, the CPU determines whether or not the rear stabilizer 64 is coupled. When a negative determination is made, the CPU advances the present control to step S60, and when an affirmative determination is made, the CPU advances the present control to step S50. Incidentally, in the situation where the mode switch 66 has been changed from the uncoupled position to the coupled position, but the stabilizer 64 is in a state before returning from the uncoupled state to the coupled state, a negative determination is made. The same goes in step S70 described below.

In step S50, the CPU calculates a target steering angle θt for causing the vehicle 102 to run along the target trajectory from the present time until a predetermined time, based on a normal steer characteristic of the vehicle. The normal steer characteristic of the vehicle is a steer characteristic when the front stabilizer 62 and the rear stabilizer 64 are in the coupled state.

In step S60, the CPU calculates a target steering angle θt for causing the vehicle 102 to run along the target trajectory from the present time until a predetermined time, based on an understeer characteristic of the vehicle. The understeer characteristic of the vehicle is a steer characteristic when the front stabilizer 62 is in the coupled state and the rear stabilizer 64 is in the uncoupled state.

In step S70, the CPU determines whether or not the rear stabilizer 64 is coupled as in step S40. When a negative determination is made, the CPU advances the present control to step S90, and when an affirmative determination is made, the CPU advances the present control to step S80.

In step S80, the CPU calculates a target steering angle θt for causing the vehicle 102 to run along the target trajectory from the present time until a predetermined time, based on an oversteer characteristic of the vehicle. The oversteer characteristic of the vehicle is a steer characteristic when the front stabilizer 62 is in the uncoupled state and the rear stabilizer 64 is in the coupled state.

In step S90, the CPU calculates a target steering angle θt for causing the vehicle 102 to run along the target trajectory from the present time until a predetermined time, based on a weak oversteer characteristic of the vehicle. The weak oversteer characteristic of the vehicle is a steer characteristic when the front stabilizer 62 and the rear stabilizer 64 are in the uncoupled state.

When step S50, S60, S80 or S90 is completed, the CPU advances the present control to step S110. In step S110, the CPU activates the alarm device 52 to issue an alarm, and also outputs a command signal to the EPS-ECU 40 so that a steering angle θ becomes the target steering angle θt. The alarm may be an alarm indicating that there is an obstacle in front of the vehicle and that the automatic steering is performed to avoid a collision with the obstacle.

In steps S50, S60, S80 and S90, for example, a turning radius of the target trajectory from the present time until the predetermined time later may be calculated as a target turning radius, and the target steering angle θt may be calculated as a steering angle for making a turning radius of the vehicle 102 to be the target turning radius. Thus, the steer characteristics in these steps may be a relationship between the turning radius of the vehicle 102 and the steering angle θ when the front and rear stabilizers 62 and 64 are in their respective coupled or uncoupled states. Since this relationship is determined by specifications of the vehicle, it may be determined in advance for each specification of a vehicle.

As can be understood from the above description, according to the first embodiment, when it is determined that a collision with an obstacle in front of the vehicle needs to be avoided (S10), and it is determined that at least one of the stabilizers is in the uncoupled state (S30, S40, S70), a target steering angle θt as a target control amount for causing the vehicle to run along the target trajectory is calculated based on the steer characteristic of the vehicle when at least one of the stabilizers is in the uncoupled state (S60, S80, S90).

Therefore, even when at least one of the stabilizers is in the uncoupled state and the steer characteristic of the vehicle is different from the normal steer characteristic of the vehicle when both of the stabilizers are in the coupled state, a target steering angle θt can be calculated so as to be a steering angle for causing the vehicle to run along the target trajectory. Therefore, even if at least one of the front and rear stabilizers is in the uncoupled state, the vehicle can be driven along a target trajectory for avoiding a collision with an obstacle.

Collision Avoidance Support Control Routine in the Second Embodiment

As can be seen from the comparison of FIGS. 4 and 3, the CPU performs steps S10 to S40, S70 and S110 as in the first embodiment. However, in step S40, when an affirmative determination is made, the CPU advances the present control to step S100, and when a negative determination is made, the CPU advances the present control to step S65. Further, in step S70, when a negative determination is made, the CPU advances the present control to step S95, and when an affirmative determination is made, the CPU advances the present control to step S85.

In step S65, the CPU modifies the target trajectory set in step S20 based on the understeer characteristic of the vehicle. The understeer characteristic of the vehicle is a steer characteristic when the front stabilizer 62 is in the coupled state and the rear stabilizer 64 is in the uncoupled state, as is the case with step S60.

Figure 6:
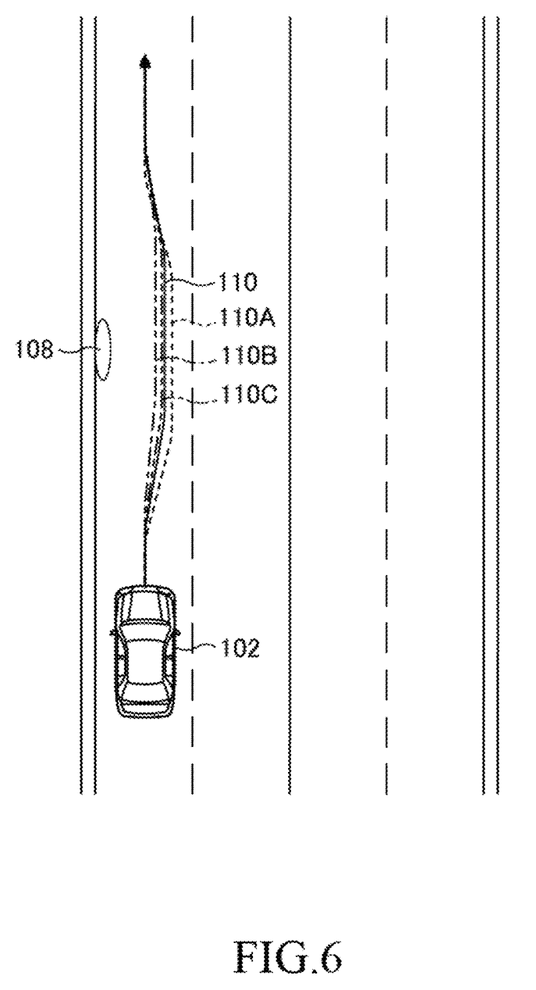
FIG. 6 is a diagram showing a target trajectory for avoiding a collision with an obstacle for various steer characteristics of a vehicle.

For example, the solid line in FIG. 6 shows a target trajectory 110 for the vehicle to avoid collision with an obstacle 108 such as a motorcycle when the front and rear stabilizers 62 and 64 are in the coupled state and the steer characteristic of the vehicle 102 is the normal steer characteristic. When the steer characteristic of the vehicle 102 is the understeer characteristic, the turning radius of the vehicle increases compared to when the steer characteristic of the vehicle is the normal steer characteristic. Therefore, in step S65, the target trajectory is modified as indicated by a broken line in FIG. 6 so that a change starts earlier than the target trajectory 110 and a change amount is corrected to be larger than the target trajectory 110.

In step S85, the CPU modifies the target trajectory set in step S20 based on the oversteer characteristic of the vehicle. The oversteer characteristic of the vehicle is a steer characteristic when the front stabilizer 62 is in the uncoupled state and the rear stabilizer 64 is in the coupled state.

When the steer characteristic of the vehicle 102 is the oversteer characteristic, the turning radius of the vehicle is reduced as compared to when the steer characteristic of the vehicle is the normal steer characteristic. Therefore, in step S85, the target trajectory is modified as shown by a chain line in FIG. 6 so that a change starts slower than the target trajectory 110 and a change amount is corrected to be smaller than the target trajectory 110.

In step S95, the CPU modifies the target trajectory set in step S20 based on the weak oversteer characteristic of the vehicle. The weak oversteer characteristic of the vehicle is a steer characteristic when the front stabilizer 62 and the rear stabilizer 64 are in the uncoupled state.

When the steer characteristic of the vehicle 102 is the weak oversteer characteristic, the turning radius of the vehicle is slightly smaller as compared to when the steer characteristic of the vehicle is the normal steer characteristic. Therefore, in step S95, the target trajectory is modified as shown by two-dot chain line in FIG. 6 so that a change slightly slower than the target trajectory 110 starts and a change amount is modified to be slightly smaller than the target trajectory 110.

When step S65, S85 or S95 is completed, the CPU advances the present control to step S100. In step S100, the CPU calculates a target steering angle θt for causing the vehicle 102 to run along the modified target trajectory from the present time until a predetermined time, based on the normal steer characteristic of the vehicle. Notably, when an affirmative determination is made in step S40, the target trajectory is not modified, so that a target steering angle θt is calculated based on the target trajectory set in step S20 as a modified target trajectory.

As will be appreciated from the above description, according to the second embodiment, when at least one of the stabilizers is in the uncoupled state, the target trajectory 110 is modified based on the steer characteristic of the vehicle 102 at that time (S65, S85, S95). Furthermore, by calculating a target steering angle θt for causing the vehicle 102 to run along the modified target trajectory 110A~110C (S100), the target steering angle θt for causing the vehicle to run along the target trajectory is calculated based on the steer characteristic of the vehicle when at least one of the stabilizers is in the uncoupled state.

Therefore, similar to the first embodiment in which the target steering angle θt for causing the vehicle 102 to run along the target trajectory is calculated based on the steer characteristic of the vehicle when at least one of the stabilizers is in the uncoupled state, the target steering angle θt for causing the vehicle to run along the target trajectory can be calculated based on the steering characteristic of the vehicle. Accordingly, even when at least one of the front and rear stabilizers 62 and 64 is in the uncoupled state, the vehicle 102 can be driven along the target trajectory 110 for avoiding a collision with the obstacle 108.

Collision Avoidance Assistance Control Routine in the Third Embodiment

As can be seen from the comparison of FIGS. 5 and 3, the CPU performs steps S10 to S80 and S110 as in the first embodiment. However, in step S70, when an affirmative determination is made, the CPU advances the present control to step S80, but when a negative determination is made, the CPU advances the present control to step S120.

In step S120, the CPU activates the alarm device 52 to issue an alarm, but does not perform the calculation of the target steering angle θt for causing the vehicle to run along the target trajectory and the control of the steering angle based on the target steering angle, so that the automatic steering for avoiding a collision is not performed. The alarm may be an alarm to the effect that there is an obstacle in front of the vehicle, but the automatic steering is not performed to avoid a collision with the obstacle. Additionally, when the front and rear stabilizers 62 and 64 are in the uncoupled state due to failure, the alarm may include an alarm to indicate that the stabilizers have failed.

As can be understood from the above description, according to the third embodiment, when the front and rear stabilizers 62 and 64 are in the uncoupled state, even if it is determined that a collision with an obstacle 108 in front of the vehicle 102 needs to be avoided, a target steering angle θt is not calculated, and the automatic steering device 44 is not controlled based on the target steering angle θt. Therefore, it is possible to avoid the automatic steering being performed in the situation where both stabilizers are in the uncoupled state and the roll rigidity of the vehicle, and thus the steering stability, is lowered, and a running direction of the vehicle changes without depending on the driver's steering operation and a behavior of the vehicle becomes unstable.

In addition, since an alarm to the effect that the automatic steering is not performed to avoid a collision with an obstacle is issued, the driver can recognize that the automatic steering is not performed and a collision with an obstacle must be avoided by his/her own driving operation.

While the present disclosure has been described in detail with reference to specific embodiments, it will be apparent to those skilled in the art that the present disclosure is not limited to the embodiments described above, and various other embodiments are possible within the scope of the present disclosure.

For example, a target control amount for causing a vehicle to run along a target trajectory to avoid a collision with an obstacle may be a target steering angle of steered wheels, and a steering angle of steered wheels may be controlled so as to be the target steering angle in step S110.

Further, when a negative determination is made in step S70 in the second embodiment, step S120 in the third embodiment may be performed (a modification of the second embodiment). According to this modification, the same effect as the third embodiment is obtained when the front stabilizer 62 and the rear stabilizer 64 are in the uncoupled state.

Further, deterioration of steering stability in the situation where the front and rear stabilizers 62 and 64 are in the uncoupled state becomes more pronounced as a magnitude of the steering angle increases and a vehicle speed increases. Therefore, even if a negative determination is made in step S70, step S90 or S95 may be performed when a vehicle speed is equal to or less than a reference value (a positive constant), and step S120 may be performed when the vehicle speed exceeds the reference value.

What is claimed is:

1. A collision avoidance support device that is applied to a vehicle equipped with clutch-type front and rear stabilizers controlled in a coupled state and in an uncoupled state and an automatic steering device that automatically steers steered wheels, and comprises an electronic control unit that is configured to, when it is determined that a collision with an obstacle in front of the vehicle needs to be avoided, calculate a target control amount for causing the vehicle to run along a target trajectory for avoiding a collision with the obstacle and control the automatic steering device based on the target control amount, wherein
the electronic control unit is configured to, in a situation in which the front and rear stabilizers are in the coupled state, calculate a first target control amount for causing the vehicle to run along a first target trajectory based on a normal steer characteristic of the vehicle when the front and rear stabilizers are in the coupled state; in a situation in which the front stabilizer is in the coupled state and the rear stabilizer is in the uncoupled state, calculate a second target control amount for causing the vehicle to run along a second target trajectory based on a steer characteristic of the vehicle that is on understeer side relative to the normal steer characteristic; and in a situation in which the front stabilizer is in the uncoupled state and the rear stabilizer is in the coupled state, calculate a third target control amount for causing the vehicle to run along a third target trajectory based on a steer characteristic of the vehicle that is on oversteer side relative to the normal steer characteristic.

2. The collision avoidance support device according to claim 1, wherein the second target trajectory is a target trajectory that starts changing earlier and has a larger change amount than the first target trajectory, and the third target trajectory is a target trajectory that starts changing later and has a smaller change amount than the first target trajectory.

3. The collision avoidance support device according to claim 1, wherein the electronic control unit is configured, when the front and rear stabilizers are in the uncoupled state, not to calculate the target control amount and not to control the automatic steering device based on the target control amount, even when it is determined that a collision with an obstacle in front of the vehicle needs to be avoided.

4. The collision avoidance support device according to claim 3, wherein the electronic control unit is configured to issue an alarm to the effect that the automatic steering for avoiding a collision with the obstacle is not performed.

5. A collision avoidance support method that is applied to a vehicle equipped with clutch-type front and rear stabilizers controlled in a coupled state and in an uncoupled state and an automatic steering device that automatically steers steered wheels and comprises processes of: when it is determined that a collision with an obstacle in front of the vehicle needs to be avoided, calculating a target control amount for causing the vehicle to run along a target trajectory to avoid a collision with the obstacle, and controlling the automatic steering device based on the target control amount, wherein
the method further comprises, when it is determined that a collision with an obstacle in front of the vehicle needs to be avoided in a situation in which the front and rear stabilizers are in the coupled state, calculating a first target control amount for causing the vehicle to run along a first target trajectory based on a standard steer characteristic of the vehicle when the front and rear stabilizers are in the coupled state; in a situation in which the front stabilizer is in the coupled state and the rear stabilizer is in the uncoupled state, calculating a second target control amount for causing the vehicle to run along a second target trajectory based on a steer characteristic of the vehicle that is on understeer side relative to the normal steer characteristic; and in a situation in which the front stabilizer is in the uncoupled state and the rear stabilizer is in the coupled state, calculating a third target control amount for causing the vehicle to run along a third target trajectory based on a steer characteristic of the vehicle that is on oversteer side relative to the normal steer characteristic.

* * * * *